Jan. 13, 1942.	G. M. SMITH	2,270,013
COVERED ARC WELDING ELECTRODE AND PROCESS OF MAKING THE SAME
Filed Aug. 3, 1940

George M. Smith
INVENTOR.

BY
ATTORNEY.

Patented Jan. 13, 1942

2,270,013

UNITED STATES PATENT OFFICE 2,270,013

COVERED ARC WELDING ELECTRODE AND PROCESS OF MAKING THE SAME

George M. Smith, Milwaukee, Wis., assignor to A. O. Smith Corporation, Milwaukee, Wis., a corporation of New York Application August 3, 1940, Serial No. 350,406

14 Claims. (Cl. 219—8)

This invention relates to covered arc welding electrodes and the manufacture thereof, and more particularly to electrodes for continuous automatic arc welding and which are normally wound on reels for storage, shipment and use.

One of the problems in the manufacture and use of such electrodes lies in the fact that the coverings employed are in effect electrical insulating and consequently it has been the practice in the past to provide bare areas or to cut through the covering at spaced points to allow electrical contact with the rod as it is fed forward to the arc. Another problem lies in the fact that the covering material in most instances is extruded upon the rod and subsequently baked so that it becomes hard and is apt to spall off in reeling and later in feeding to the arc.

The principal object of the present invention is to provide a simple and economic means for solving both of the above problems simultaneously.

Another object of the invention is to provide a covering for an electrode, which covering is of the extruded type having means for making electrical contact therethrough and for holding the same in place for handling.

Another object is to provide a method of manufacturing covered arc welding electrodes which is simple and efficient and which provides an electrode of superior and new properties.

Figure 1 of the drawing illustrates the construction of a preferred embodiment of the invention;

Figure 1:
Figure 2:
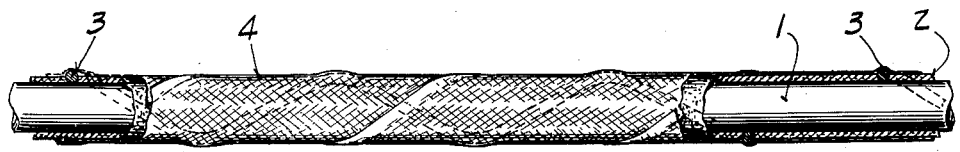
Fig. 2 illustrates a modified form of the invention.
Figure 3:
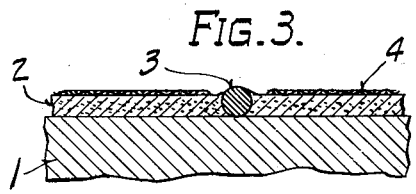
Figs. 3 and 4 are enlarged fragmentary sections of the embodiments shown in Figs. 1 and 2 respectively.
Figure 4:
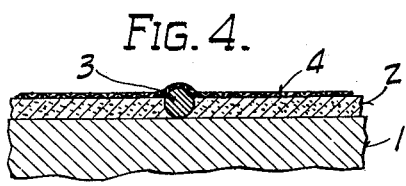

The invention is adapted to the use of any of the known commercial extruded covering compositions and in the manufacture of the electrode, as the rod 1 and its covering 2 are ejected from the extrusion nozzle a small wire 3 is wound spirally into the covering under tension sufficient to bring it into contact with the metal rod, and a very thin but strong porous gauze tape 4 is wound spirally either in overlapping relation over the outside of the covering and wire, as shown in Fig. 2, or in spaced relation over the covering between the convolutions of wire, as shown in Fig. 1.

In the manufacture the wire employed is of greater thickness than the extruded covering so that it will not be buried in the covering, and it is possible to extrude a slightly thinner covering than would be desirable otherwise since the impressing of the wire in the covering tends to thicken the latter between the convolutions of wire.

The wire is preferably of the same metal composition as the rod, which is ordinarily steel, but under the invention special alloy wires may be employed and in some instances copper or other highly conductive material may be used. The convolutions of wire will ordinarily be spaced from one half an inch to two or three inches apart axially of the rod. Where the spacing is large, it may be of advantage to provide two or more wires wound parallel to each other. The wire should be wound spirally on the rod as distinguished from being pressed axially parallel to it since by spiral winding, it can be pulled tight to insure that it will contact with the core of the rod, and later reeling of the rod will not cause the wire to stress the covering too highly.

The gauze should be a high grade light weight coarse mesh cotton gauze and where it is wound between wire convolutions, it should have a width corresponding to that of the covering between such convolutions. Where the gauze is applied in overlapping relation over the wire and covering alike, it has been found that it does not seriously interfere with the contact of rollers on the wire for carrying welding current to the rod. However, it is preferable to leave the outer surface of the wire bare for good electrical contact to get the best and most uniform results.

The convolutions should be sufficiently close to prevent excessive stress on the covering when the rod is coiled. The gauze will normally hold the covering material in place during reeling and subsequent handling as against considerable stress from the wire. In manufacture, the rod is reeled immediately as it comes from the machine applying the wire and gauze and the reels of rod are transferred to the usual baking oven and then to storage or shipment. In use the reels are secured in place on the welding machine and the rod threaded through the machine. Either roller or wiping electrical contacts may be applied to the rod at a position shortly above the arc to supply the required welding current to the electrode.

While it has previously been proposed to provide a spiral winding of wire prior to extrusion, the proposal has not been used commercially since the outer surface of the wire was not left sufficiently free from covering material to make good electrical contact. Furthermore, with the proposal, it was necessary to have the convolutions of wire very close to hold the covering in place and even then reeling caused too high a stressing of the covering.

With the present invention, the gauze holds the covering material in place against stress from the wire while reeling. Furthermore, by applying the wire after extrusion of the covering, any possible air cavities in the covering are avoided and the outer surface of the wire will not be smeared over with covering material.

Various embodiments of the invention may be employed within the scope of the accompanying claims.

The invention is claimed as follows:

1. An electrode for electric arc welding, comprising a metal rod, a covering extruded thereon, a wire impressed in said covering in contact with said rod and having its outer surface free from extruded covering material for electrical contact to supply welding current to the rod, and means applied to the outer surface of the covering to strengthen the covering and hold it in place against stress in handling and from said wire.

2. An electrode for electric arc welding comprising a metal rod, a plastically formed covering thereon, a metal wire impressed in said covering in spaced spiral convolutions in contact with said rod and having its outer surface free from covering material for electrical contact to supply welding current to the rod, and means applied to the outer surface of the covering to strengthen the same and hold the covering in place against stress from the wire and in handling.

3. A continuous reeled electrode for electric arc welding, comprising a metal rod, a plastically formed covering thereon, and a metal wire of greater diameter than the thickness of the covering impressed therein in continuous spiral convolutions and in contact with said rod to supply welding current thereto, and having its outer surface free from covering material to provide for receiving said current from electrical contact means applied to the electrode progressively during welding.

4. A continuous reeled electrode for electric arc welding, comprising a metal rod, a plastically formed covering thereon, a metal wire of a diameter corresponding to the thickness of the covering applied to the rod in continuous spaced spiral convolutions and in substantially continuous contact with said rod to supply welding current thereto, and means overlying the covering material to strengthen the same and hold the covering against displacement during manufacture and handling while leaving the outer surface of the wire substantially free for electrical contact to supply the welding current thereto.

5. A continuous reeled electrode for electric arc welding, comprising a metal rod, an extruded covering thereon, a wire of a diameter exceeding the thickness of the extruded covering applied to the rod in continuous spaced spiral convolutions and in substantially continuous contact with said rod to supply welding current thereto, and means overlying the covering material to strengthen the same and hold the covering against displacement in handling while leaving the outer surface of the wire exposed for electrical contact to supply the welding current thereto.

6. A continuous reeled electrode for electric arc welding comprising a metal rod, an extruded covering thereon, a wire wrapped spirally around the rod with its inner surface in substantially continuous electrical contact with the rod and its outer surface exposed to receive contacts for supplying welding current thereto, and a tape wrapped spirally over the covering between the convolutions of wire to hold the covering in place.

7. A continuous reeled electrode for electric arc welding comprising a metal rod, an extruded covering thereon, a wire wrapped spirally around the rod with its inner surface in substantially continuous electrical contact with the rod and its outer surface substantially exposed to receive contacts for supplying welding current thereto, and a porous gauze wrapped in overlapping spiral formation over said covering and wire.

8. In the manufacture of electrode for electric arc welding, the combination of steps comprising applying covering material in plastic form to the rod and thereafter impressing therein a continuous wire of diameter corresponding to the thickness of the covering until the wire is brought into substantially continuous contact with the metal core of the rod.

9. In the manufacture of electrode for electric arc welding, the combination of steps comprising applying covering material in plastic form to the rod and thereafter wrapping a fine wire tightly around the rod in spaced continuous spiral convolutions to bring it into substantially continuous electrical contact with the rod while leaving its outer surface free from covering material.

10. In the manufacture of continuous reeled electrode for electric arc welding, the combination of steps comprising extruding a plastic covering material on the rod, and spirally winding thereon a wire having a diameter corresponding to the thickness of the covering while pulling the wire tight to effect its cutting through the covering and making substantially continuous electrical contact with the rod.

11. In the manufacture of continuous reeled electrode for electric arc welding, the steps of extruding a plastic covering material on the rod, and spirally winding thereon a wire having a diameter exceeding the thickness of the extruded covering while pulling the wire tight to effect its cutting through the covering and making substantially continuous electrical contact with the rod.

12. In the manufacture of continuous reeled electrode for electric arc welding, the combination of steps comprising extruding a plastic covering material on the rod, spirally winding thereon a wire having a diameter corresponding to the thickness of the covering while pulling the wire tight to effect its cutting through the covering and making substantially continuous electrical contact with the rod, and wrapping said covering with a spiral tape to hold the same in place.

13. In the manufacture of continuous reeled electrode for electric arc welding, the combination of steps comprising extruding a plastic covering material on the rod, spirally winding thereon a wire having a diameter corresponding to the thickness of the covering while pulling the wire tight to effect its cutting through the covering and making substantially continuous electrical contact with the rod, and wrapping the rod with overlapping spirals of gauze.

14. In the manufacture of continuous reeled electrode for electric arc welding, the combination of steps comprising extruding a plastic covering material on the rod, spirally winding thereon a wire having a diameter corresponding to the thickness of the covering while pulling the wire tight to effect its cutting through the covering and making substantially continuous electrical contact with the rod, and applying a spiral wrapping of tape on the covering material between the spiral convolutions of wire, leaving the wire free for electrical contact during welding.

GEORGE M. SMITH.